May 20, 1958

H. E. TEMPLE ET AL 2,835,398

BREAD DEPANNER

Filed April 21, 1955

INVENTOR.
Hiram E. Temple
BY John C. Stafford

Otto Moeller
Attorney

May 20, 1958    H. E. TEMPLE ET AL    2,835,398
BREAD DEPANNER

Filed April 21, 1955    5 Sheets-Sheet 2

INVENTOR.
Hiram E. Temple
BY John C. Stafford

Otto Moeller
Attorney

May 20, 1958 H. E. TEMPLE ET AL 2,835,398
BREAD DEPANNER
Filed April 21, 1955 5 Sheets-Sheet 3
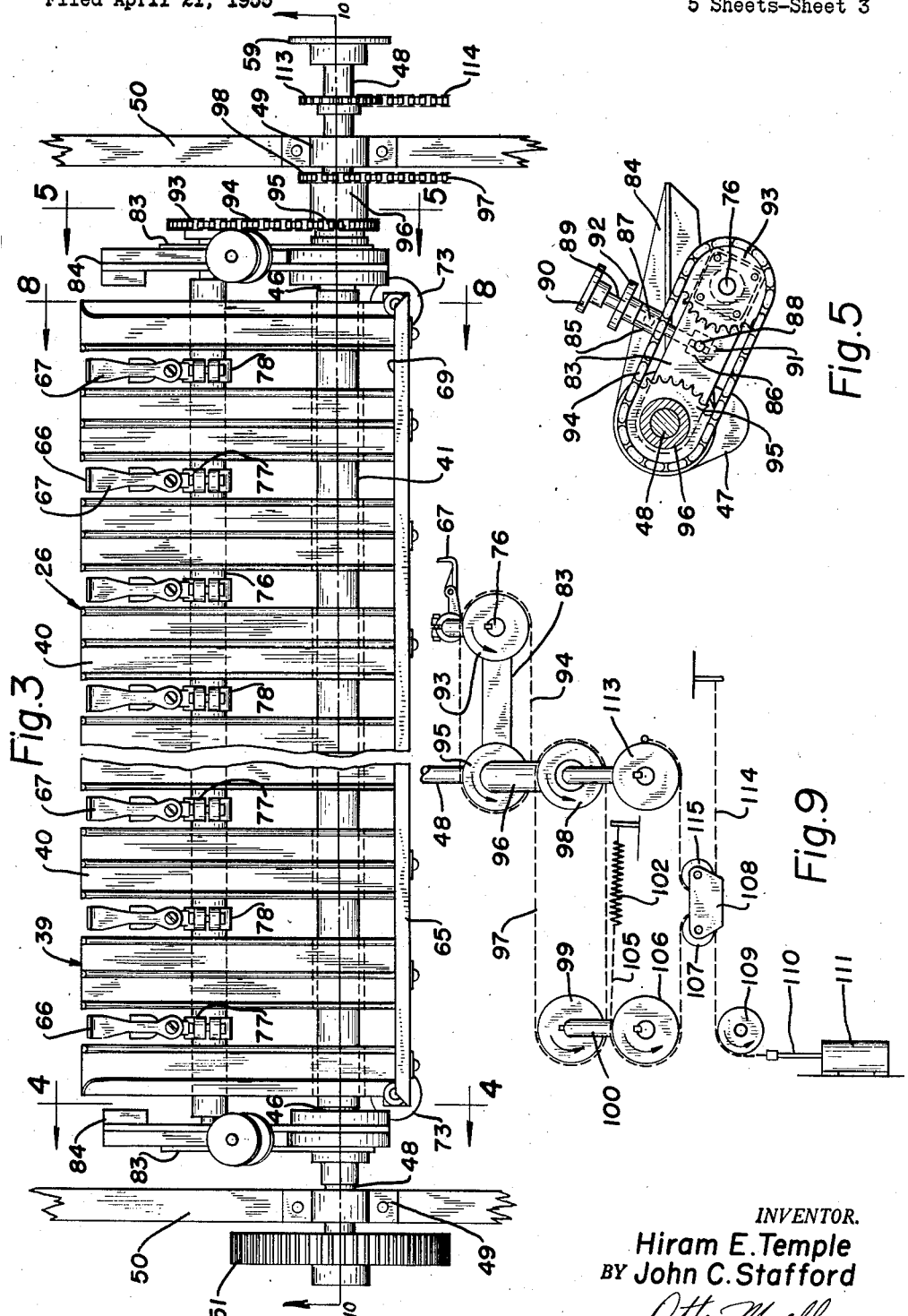
INVENTOR.
Hiram E. Temple
BY John C. Stafford
Otto Moeller
Attorney May 20, 1958    H. E. TEMPLE ET AL    2,835,398
BREAD DEPANNER Filed April 21, 1955    5 Sheets-Sheet 4

INVENTOR.
Hiram E. Temple
BY John C. Stafford

Otto Moeller
Attorney

May 20, 1958  H. E. TEMPLE ET AL  2,835,398
BREAD DEPANNER

Filed April 21, 1955  5 Sheets-Sheet 5

INVENTOR.
Hiram E. Temple
BY John C. Stafford

Otto Moeller
Attorney

United States Patent Office 2,835,398
Patented May 20, 1958

2,835,398

BREAD DEPANNER

Hiram E. Temple, New York, N. Y., and John C. Stafford, Alhambra, Calif., assignors, by mesne assignments, to Capital Products Corporation, a corporation of Pennsylvania Application April 21, 1955, Serial No. 502,767

4 Claims. (Cl. 214—314)

This invention relates to means for automatically removing the contents of containers and particularly for removing loaves of bread from the pans in which they are baked.

The apparatus is of the type embodying an oscillatory dumping structure arranged in one position, referred to as the loading position, to receive a row of pan straps, and being rotatable to a first dumping position for partially inverting the pan straps to permit the loaves of bread to drop therefrom while retaining the pan straps on the dumping structure, and being thereupon rotatable in the opposite direction to a downwardly sloping second dumping position for righting and releasing the pan straps therefrom.

The means for retaining the pan straps comprises a gripping structure carried by the dumping structure movable between, a retracted position to permit the pan straps to be delivered onto the table of the dumping structure in the said loading position thereof and to release the pan straps from the dumping structure table in the said second dumping position, and an extended position to grip and hold the pan straps on the table during movement thereof to its first and second dumping positions.

An object of the invention is to provide in apparatus such as described above, means for automatically moving the gripping structure to extended position for engaging the pan straps when the dumping structure is in its loading position and to retracted position for releasing the pan straps when the dumping structure is in its second unloading position.

Another object is to provide novel means for adjusting the movement of the gripping structure relative to the dumping structure table whereby the gripping structure is adapted to grip pans of different dimensions.

In numerous installations the height of the feeding conveyor moving the pans to the dumping structure is limited, for example, by the height of the oven hearth, so that vertical distance between the feeding conveyor and the bread take away conveyor is limited, unless an undesirable pit is provided for the take away conveyor. Where such vertical distance limitations prevail, it has in the past resulted in a comparatively flat angle of the table with the feeding conveyor causing sluggish movement of the pans across the table as they are discharged from the feeding conveyor. Dropping of the dumping structure to provide a steeper angle did not provide sufficient height for efficient delivery of the dumped bread to the bread take away conveyor without providing a pit for the take away conveyor. It is, therefore, another object of the invention to provide a construction and arrangement of parts that will provide for a more favorable angle of the dumping structure table in its loading and dumping positions within a limited vertical distance between the feed in and take away conveyors.

Other objects and advantages of the invention will become apparent from the following description when read in connection with the accompanying drawings, in which Figure 1 is a longitudinal vertical sectional view of the apparatus showing the dumping structure and associated feed in and take away conveyors;

Figure 3 is a fragmentary plan view of the apparatus showing the dumping table structure;

Figure 5 is a sectional view taken on line 5—5 of Figure 3;

Figure 9 is a diagrammatic view showing the means for operating the pan gripping structure.

Figure 1:
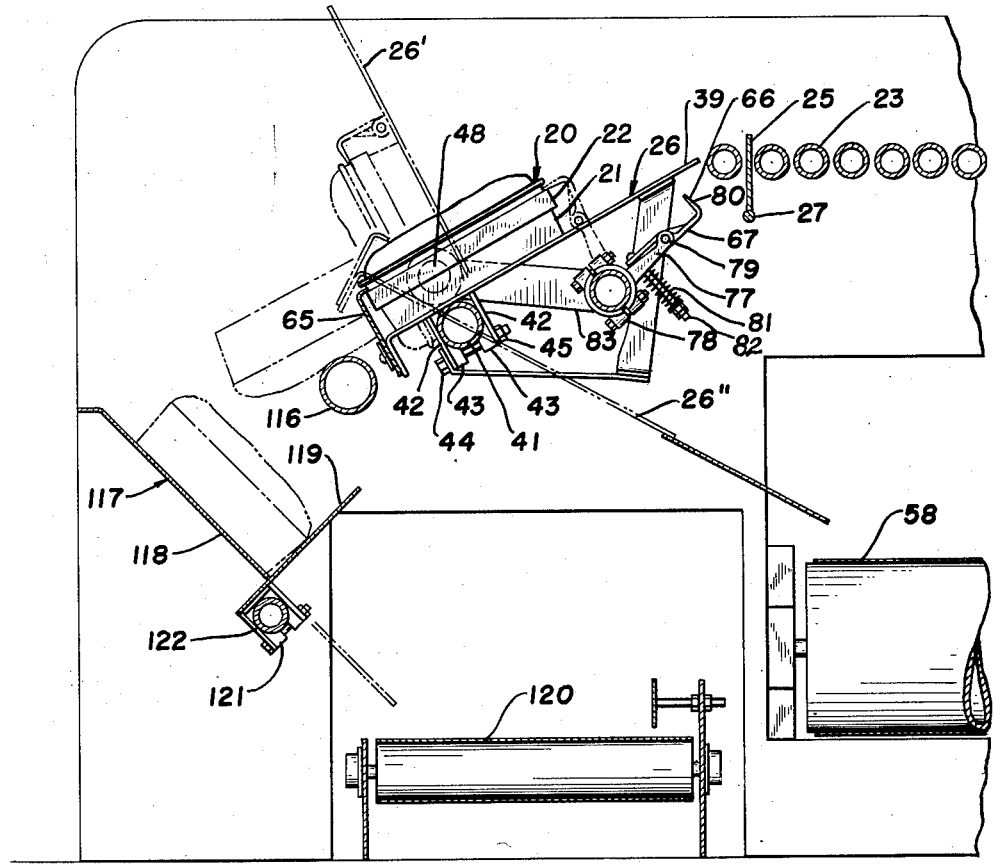

In Figure 1 of the drawings, the numeral 20 designates a conventional multiple bread pan unit, generally referred to as a pan strap, commonly used in bakeries for baking bread. The pan strap 20 includes a plurality of pans 21, usually four in number, secured together in spaced relation by a surrounding band or strap 22.

Our invention is concerned with an apparatus for extracting the baked loaves of bread from such pan straps, and particularly from a plurality of side by side pan straps 20, and it is hereinafter so described.

The pan straps 20 in which the bread is baked come from the oven, not shown, in a succession of rows with a plurality of such pan straps in each row, and are delivered in successive rows to the roller conveyor 23. Any suitable means may be provided for properly orienting and delivering the pan straps to the roller conveyor, and for operating the latter, as shown for example in Patent No. 2,633,258 granted on a joint application of George E. Tench and Hiram E. Temple. Since this constitutes no part of the present invention, there is merely shown in Figure 2, interconnected gearing 24 for operating the roller conveyor 23 from a motor (not shown) through suitable drive means (not shown).

Adjacent the forward or discharge end of the roller conveyor 23 is a gate 25 controlling the discharge of pan straps to a pan dumping structure 26, the operation of which gate is synchronized with the operation of the dumping structure as and for the purpose hereinafter described. The particular means for operating the gate 25 may conveniently be such as disclosed in the above referred to patent, though any other suitable means may be employed.

Figure 2:
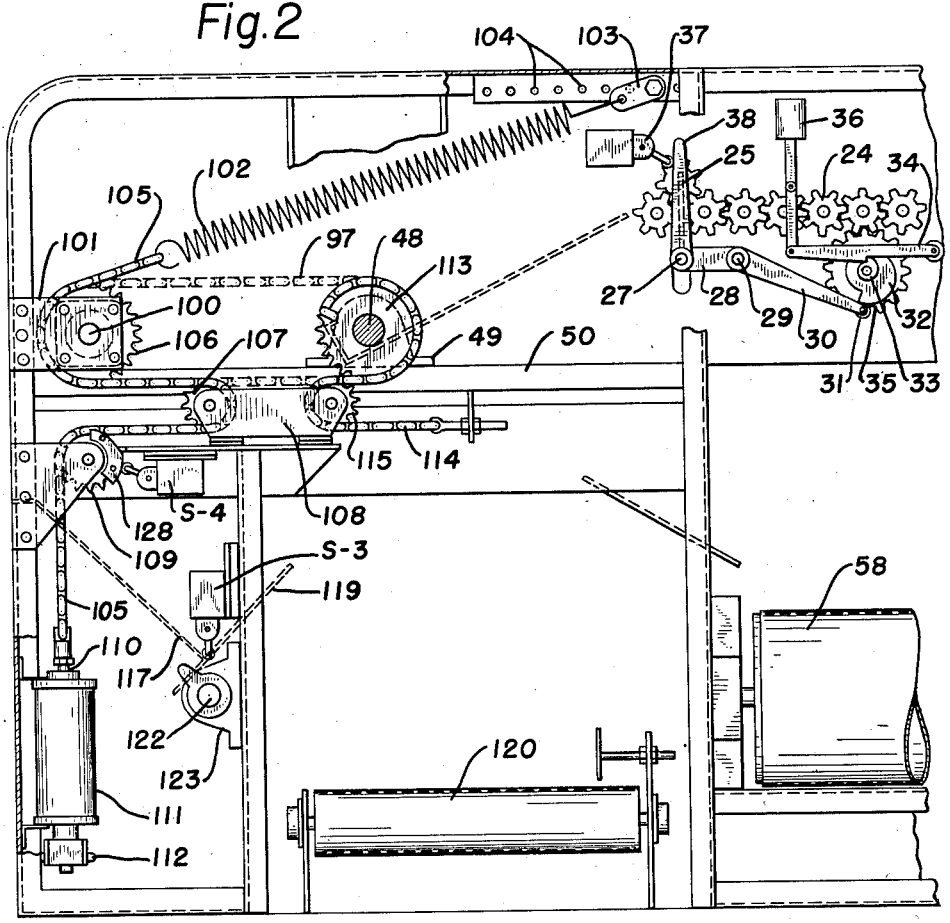
Figure 2 is a side elevation of the apparatus showing in particular the gate and operating means for controlling the delivery of pans to the dumping structure and the operating means for the pan gripping structure.

Briefly, the gate 25 is supported in an upright position by the transversely extending rod 27, the latter being carried at its ends by longitudinally extending arms 28, only one being shown in Figure 2. At their ends opposite their attachment to the rod 27, the arms 28 are rigidly secured to a rotatable shaft 29 which extends transversely beneath the roller conveyor 23. Also rigidly secured to one end of the shaft 29 is an arm 30 extending from the shaft 29 in a direction opposite the shaft 28 and carrying at its free end a cam follower 31 engaging a cam 32. As shown in Figure 2, with the cam follower 31 in engagement with the high portion of the cam 32, the gate 25 is retained in extended position, i. e., in position to intercept pan straps on the roller conveyor 23.

The cam 32 is operatively connected to a single revolution clutch 33 which is normally held disengaged by a pivoted catch lever 34. The single revolution clutch 33 is operatively connected with the gear 35 which is in mesh with one of the gears of the interconnected gearing 24 of the roller conveyor 23 and is driven thereby. Connected to the free end of the pivoted catch lever 34 is a solenoid 36 which, when energized, swings the catch lever 34 upwardly about its pivot to permit engagement of the single revolution clutch 33, the manner in which the solenoid 36 is energized being hereinafter more particularly described.

Upon engagement of the single revolution clutch 33, the cam 32 is rotated in counterclockwise direction, as viewed in Figure 2, thereby freeing the cam follower 31 from engagement with the high portion of the cam 32, permitting the gate 25 to be lowered by gravity or by spring means (not shown) to a retracted position out of the path of the pan straps, whereupon the pan straps will be discharged from the roller conveyor 23 to the damping structure 26.

The solenoid 36 is energized by closing of a normally open switch 37 which is connected in series with the solenoid 36. The switch 37 is adapted to be closed by an arm 38 on the rod 27 which rod, as previously stated, also carries the gate 25. When a plurality of side by side pan straps are to be handled by the apparatus, for example four pan straps abreast, it is preferred that at least three pan straps bear against the gate 25 before the arm 38 will be deflected enough to close the switch 37. To accomplish this, suitable means (not shown) may be provided biasing the gate against deflection until a force of predetermined magnitude is applied to the gate 25 by pan straps 20 bearing thereagainst.

Thus when the proper number of pan straps bear against gate 25, then the switch 37 closes and energizes solenoid 36, whereupon single revolution clutch 33 is released to rotate cam 32 counterclockwise from the position shown in Figure 2, thereby permitting retraction of gate 25 and allowing the pan straps to proceed to the dumping structure 26. This presupposes that the dumping structure 26 is in proper position to receive the pan straps. Any suitable means including switch means in series with solenoid 36 may be provided to prevent energization thereof except when the dumping structure 26 is in proper position to receive pan straps. Such means as shown and described in the above referred to patent may be employed, and since the particular means for accomplishing this purpose constitutes no part of the present invention, it is not shown in the drawings nor described herein.

The dumping structure 26 includes a table 39 comprising a plurality of longitudinally extending transversely spaced ribbed plate members 40, as best shown in Figure 3. Referring more particularly to Figure 1, the plate members 40 of the table 39 proximate one of their respective ends are adjustably and removably secured to a transversely extending tubular shaft 41. The securing means for one of the plate members 40 is herewith described, it being understood that the other plate members are similarly secured. A pair of brackets 42 fitting closely against opposite sides of the tubular shaft 41 depend from the under side of the plate member 40 and are rigidly secured thereto by welding or other suitable means. A pair of wedge blocks 43 are disposed between the free ends of the brackets 42 in engagement with the tubular shaft 41. A pair of bolts 44 extend through the brackets and wedge blocks, and by tightening nuts 45 on the free ends of the bolts 44, the plate members 40 are securely clamped on the shaft 41. The plate members 40 are thus readily adjustable for properly locating them on the shaft 41 and are conveniently removed and replaced.

Figure 4:
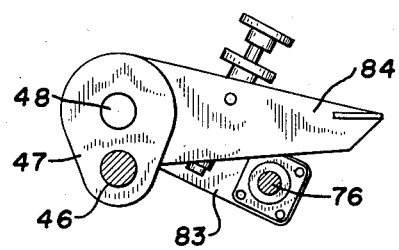
Figure 4 is a sectional view taken on line 4—4 of Figure 3.
Figure 10:
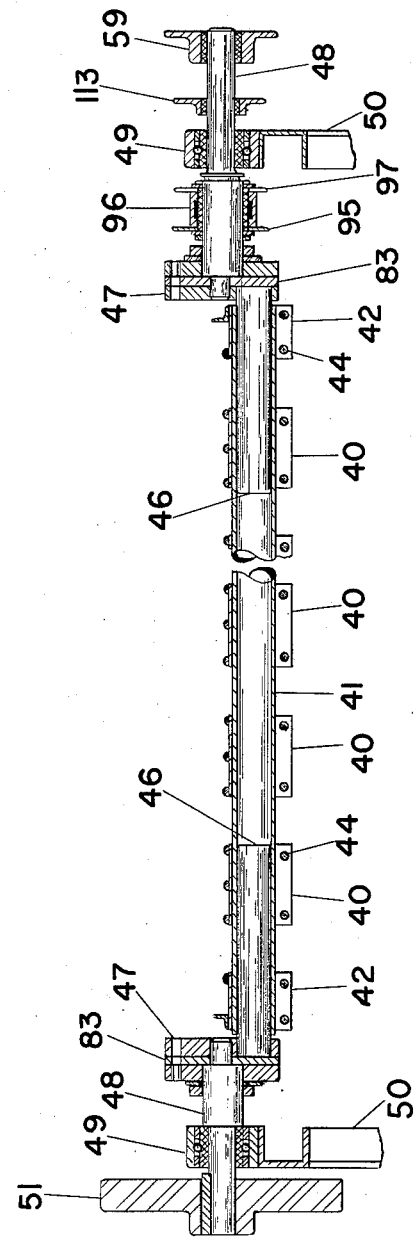
Figure 10 is a sectional view taken on the line 10—10 of Figure 3.

Welded in the opposite ends of the tubular shaft 41 are stub shafts 46 having at their free ends crank arms 47 extending from one side to the other side of the plane of the table 39, the crank arms 47 being best shown in Figures 4 and 5. To the free ends of the crank arms 47 are secured outwardly extending shafts 48 which are journaled in bearings 49 carried by the framework 50, as shown in Figure 3. The dumping structure 26 including the table 39 is thus mounted on the eccentric tubular shaft 41 for rotation about the axes of the shafts 48. The purpose of the eccentric mounting of the table 39 will become clear from the description hereinafter of the operation of the apparatus.

Figure 6:
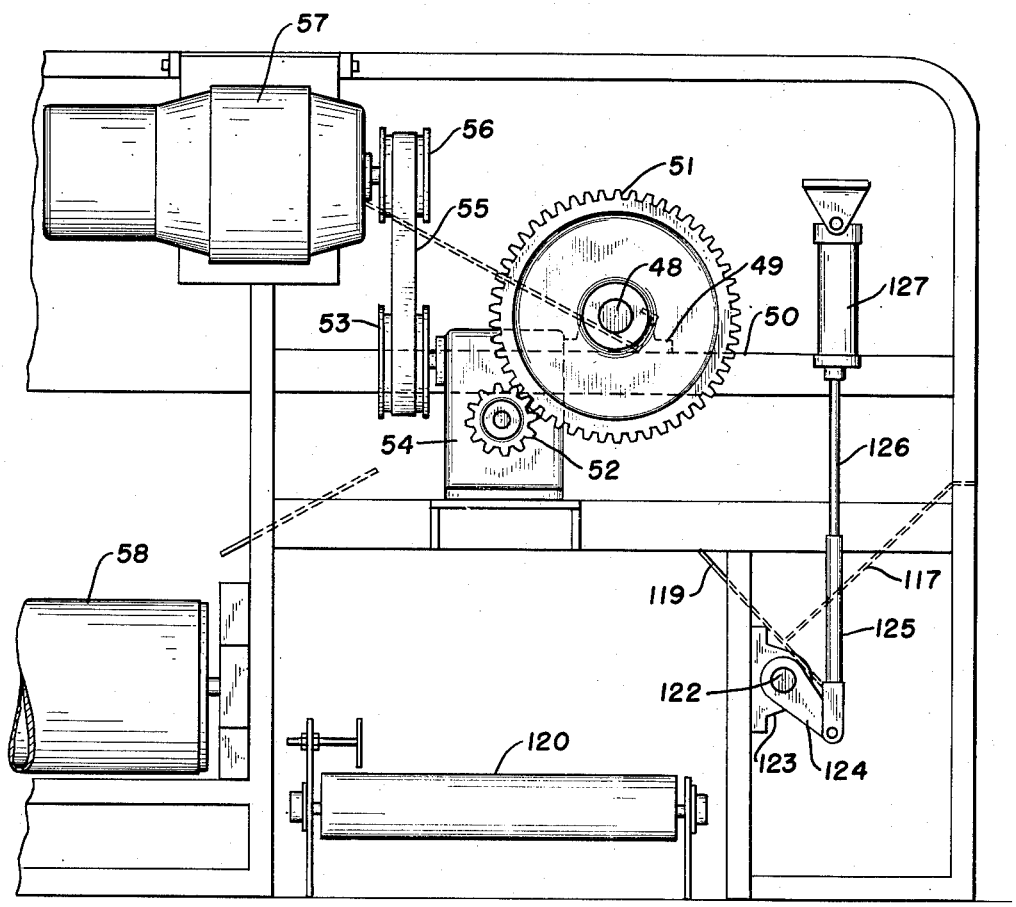
Figure 6 is a side elevation at the side of the apparatus opposite that illustrated in Figure 2, showing the operating means for rotating the dumping structure and the means for operating the bread receiving gate.

Fixed on the projecting end of one of the shafts 48, the left shaft 48 as viewed in Figure 3, is a gear 51. The gear 51, as shown in Figure 6, meshes with a gear 52, which latter gear is driven from a pulley 53 through gearing (not shown) in a gear box 54. The pulley 53 is driven through belt 55 from an aligned pulley 56; the pulley 56 being mounted on the shaft of a reversible electric motor 57.

Through the actuating means just described and suitable control means hereinafter described, the dumping structure 26 is operated through an operating cycle starting with the dumping structure 26 in its loading position as shown in full lines in Figure 1. In such loading position, the table 39 of the dumping structure slopes upwardly toward the delivery end of the roller conveyor 23 so that a row of pan straps discharged from the roller conveyor 23 slide downwardly and forwardly onto the table 39. From the loading position, the dumping structure 26 rotates in a counterclockwise direction, as viewed in Figure 1, about the axes of shafts 48, to a partially inverted or first dumping position 26', then rotates in a clockwise direction through the loading position to a downwardly sloping second dumping position 26", and thereafter returns to the loading position completing an operating cycle. In the first dumping position 26', loaves of bread are released from the pan straps 20, the pan straps 20 being retained on the dumping structure by holding means hereinafter described. In the second dumping position 26" the now empty pan straps slide off the downwardly sloping table 39 of the dumping structure onto a conveyor 58, to be carried away, the holding means being adapted to release the pan straps as hereinafter described.

Figure 7:
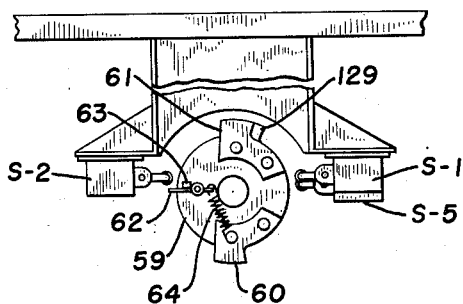
Figure 7 is a detail view in side elevation of the control means for the dumping structure motor.

Suitable means including switches in the electrical control system of the dumping structure 26 is provided for controlling the actuation of the reversible motor 57 to operate the dumping structure 26 through the above described operating cycle. A cam disk 59 is mounted on the outer end of one of the shafts 48 of the dumping structure 26 for rotation therewith. As shown in Figure 3, the cam disk 59 is mounted on the shaft 48 at the right, being shown in more detail in Figure 7 to which reference will be had.

Assuming the dumping structure 26 to be in its loading or pan receiving position as shown in Figures 1 and 2, the motor 57 is then actuated, by means later described, to rotate the dumping structure counterclockwise toward its bread dumping position 26'. A cam 60 is secured to cam disk 59 in such position so that when the dumping structure 26 has reached the desired bread dumping position 26', the cam 60 engages reversing switch S–1 whereby the direction of rotation of the motor 57 is reversed to rotate the dumping structure in clockwise direction. The dumping structure now passes through its pan receiving or loading position 26 toward its pan unloading position 26". A cam 61 is secured to cam disk 59 in such position so that when the dumping structure has reached the desired pan unloading position 26", the cam 61 engages reversing switch S–1 whereby the direction of rotation of the motor 57 is again reversed to rotate the dumping structure in counterclockwise direction.

The cam disk 59 is also provided with a pivotally mounted radially projecting arm 62 normally retained against a stop 63 by a spring 64, which arm 62 is adapted to operate the switch S–2 as the cam disk 59 rotates. As the dumping structure rotates in a clockwise direction from its first or bread dumping position 26' to its second or pan unloading position 26'', the pivotally mounted arm 62 will yield as it engages switch S–2 and will therefore disengage and pass the switch S–2 without operatively affecting it. Subsequently, as the dumping structure returns from its second or pan unloading position 26'' to its loading or pan receiving position, the cam disk 59 is rotated in counterclockwise direction, as viewed in Figure 7 and the radially projecting arm 62 engages the switch S–2 and actuates the same since because of stop member 63 the arm 62 will not now yield. Actuation of switch S–2, through suitable electrical connections, stops the motor 57 as the dumping structure 26 is returned to its loading or pan receiving position. Upon actuating the switch S–2, the arm 62 is caused to move past the switch S–2 into the position shown in Figure 7 of the drawings and disengages the same.

Suitable time delay relays are incorporated in the electrical control system for retaining the dumping structure in its various positions a sufficient length of time to permit the different loading and unloading operations to take place. Such mechanism does not constitute a part of the present invention and is therefore not described, and for which reference may be had to the aforementioned patent.

The holding means above referred to for retaining the pans on the dumping structure in the bread dumping position 26' and the operation thereof will now be described. This holding means includes a fixed but adjustable gripping structure 65 which is adapted to engage the forward end of a pan strap 20 on the table 39 of the dumping structure 26, and a rotatable gripping structure 66 carried by the dumping structure 26 adapted to engage the rearward end of the pan strap. The rotatable gripping structure 66 includes gripping fingers 67. The gripping structure 66 is arranged for movement between a retracted position as shown in full lines in Figure 1 wherein the fingers 67 are out of engagement with the pan straps, and an extended position as shown in phantom in Figure 1 wherein they engage the rearward end of the pan straps.

Figure 8:
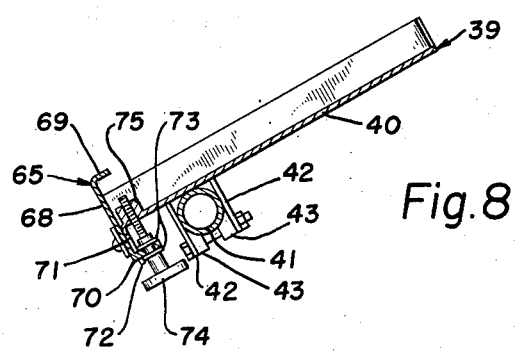
Figure 8 is a sectional view taken on line 8—8 of Figure 3.

Referring particularly to Figures 3 and 8, the gripping structure 65 comprises a wall 68 at the forward end of the table 39 and which at its upper edge is provided with a rearwardly projecting lip 69. The wall 68 forms a stop for the pan straps 20 as they slide downwardly and forwardly on the table 39 from the conveyor 23 with the dumping structure 26 in its loading position. The lip 69 on the wall 68 is adapted to hook over the upper edge of the strap 22 interconnecting the individual pans of a pan strap. The gripping structure is arranged for adjustment to raise or lower the lip 69 for gripping the straps of different types of pans. The adjusting means includes recessed inwardly extending lugs 70 at the ends of the wall 68, which lugs 70 extend through openings 71 in the downturned flanges 72 of the outermost plate members 40. The recessed lugs 70 are received between lips 73 of adjusting screws 74 which are threaded in bosses 75 on the outermost plate members 40 of the table 39. Thus by turning the adjusting screws 74 in one direction or the other, the gripping structure 65 is raised or lowered to proper position for gripping the pan straps.

The rotatable gripping structure 66 includes a horizontal shaft 76 which extends transversely the full length of the dumping structure 26 beneath the table 39 thereof and which shaft 76 is rotatable relative to the table 39. Referring in particular to Figures 1 and 3, between the laterally spaced plate members 40 of the table are brackets 77 secured to the shaft 76 by clamping means 78. Each of the brackets 77 has pivotally connected thereto at 79 a gripping finger 67. The gripping fingers 67 are provided with forwardly directed lips 80 which are adapted to hook over the upper edge of the strap 22 interconnecting the individual pans of a pan strap.

The gripping fingers 67 are rotatable into engagement with a row of pan straps 20 on the table 39 as the gripping structure 66 rotates from its retracted position as shown in full lines in Figure 1 to its extended position as shown in broken lines. The gripping fingers 67 are individually in yieldable engagement with the pan straps on the table 39 by compression springs 81, each of the latter being retained by a bolt 82 which extends through the corresponding gripping finger 67 and the bracket 77 on which it is mounted. The purpose of the springs is to compensate for any irregularities in the rearward end of the pan straps 20.

Near its opposite ends the gripping structure shaft 76 is rotatably mounted in one end of arm members 83, the other end of said arm members 83 being pivotally mounted on the shafts 48. Brackets 84 adjacent the arm members 83 are rigidly secured to the shafts 48 and are arranged for supporting the arms 83 and consequently the gripping structure 66 in pivotally adjusted position, whereby upon rotation of the shafts 48, the table 39 and gripping structure 66 move as a unit through the various positions 26, 26' and 26'' of the dumping structure.

The pivotal adjusting means for the gripping structure 66 to provide for gripping of pans of different length or height will be described with particular reference to Figure 5 showing the arrangement at the right side of the dumping structure 26 as viewed in Figure 3, it being understood that a similar arrangement is provided at the left side thereof. An upper block 85 and a lower block 86 are provided respectively with laterally projecting pins 87 and 88 extending through and rotatably mounted in the adjacent sides of the bracket 84 and arm 83 respectively, whereby the blocks 85 and 86 are pivotally supported. An adjusting screw 89 having a knob 90 is threaded through the upper block 85 and has a lower reduced portion extending freely through an opening in the lower block 86. A nut 91 on the lower end of the adjusting screw 89 holds the lower block 86 thereby supporting the arm 83 and the gripping structure 66. Thus by turning the knob 90 of the adjusting screw 89 in one direction or the other, the gripping structure 66 is pivotally adjustable whereby the position of the gripping fingers 67 relative to the table 39 may be changed to grip pan straps of different length or height. A locknut 92 is provided for locking the gripping structure in adjusted position.

In addition to moving as a unit with the table 39, the gripping structure 66 is also movable relative to the table 39, to an extended position to grip the pan straps and to a retracted position to release the pan straps, as previously observed.

Turning now to the manner in which the gripping structure 66 is rotated from retracted to extended position and vice versa, and referring particularly to Figures 2, 3 and 9, the gripping structure shaft 76 has a sprocket 93 fixed on one end thereof. A sprocket chain 94 is trained over sprocket 93 and a sprocket 95 of a double idler sprocket 96, the latter being freely mounted on the shaft 48. Another sprocket chain 97 is trained around the other sprocket 98 of the double idler sprocket 96 and a sprocket 99 fixed on a shaft 100, the latter shaft being journaled in bearing brackets 101 secured to a stationary frame member of the dumping apparatus. A spring 102, as hereinafter explained, biases the gripping structure 66 toward its retracted position. One end of the spring 102 is connected to a stationary frame member of the dumping apparatus by a link 103, the link 103 being attachable to the frame member at any one of a number of points 104 for varying the tension of the spring 102, as best shown in Figure 2. Connected to the opposite end of the spring 102 is a sprocket chain 105 which is trained over a sprocket 106 fixed on shaft 100, sprocket 107 of sliding idler 108, idler sprocket 109, and attached to the end of the piston rod 110 of an air cylinder or motor 111. A solenoid operated valve 112, Figure 2, controlled in a manner hereinafter explained, functions to selectively admit air to the upper end of cylinder 111 to move the gripping structure 66 to its extended or pan gripping position, or to admit air to the lower end of cylinder 111 to move the gripping structure 66 to its retracted or pan releasing position.

Assuming the dumping structure 26 to be in its pan receiving position and the pan gate 25 has been retracted to permit a row of pans to be delivered onto the table 39 and the gripping structure is in its retracted position as shown in Figure 9, the valve 112 then operates, as hereinafter explained, to admit air to the upper end of cylinder 111. Downward movement of the piston rod 110 draws the chain 105 with it against the tension of spring 102 whereby sprockets 106, 99, 98, 95 and 93 rotate in counterclockwise direction, as viewed in Figure 9, thereby moving the gripping structure 66 to its extended or pan gripping position. In order to maintain the gripping structure 66 in engagement with the pans as the dumping structure rotates to and from its bread dumping position 26', a compensating sprocket 113 is fixed to the shaft 48. A chain 114, attached at one end to the sprocket 113, is trained around the sprocket 115 of the sliding idler 108, and is secured at its opposite end to a stationary frame member of the apparatus. Assume, for example, that the dumping structure is rotating toward its bread dumping position 26', then the sprocket 113 will also rotate since it is fixed to the dumping structure shaft 48, whereupon the chain 114 winds up on the sprocket 113 pulling the sliding idler 108 to the right as viewed in Fig. 9. This movement of the sliding idler 108 effects, through chains 105, 97 and 94, rotation of the sprockets 106, 99, 98, 95 and 93 a distance equal to the rotation of sprocket 113, thus the gripping structure 66 is maintained in the same relative fixed position with respect to the dumping structure 26, regardless of rotation of the latter, until such time in the cycle of operation of the dumping structure when valve 112 is actuated to admit air to the lower end of the cylinder 111. When this occurs, the piston 110 moves up, whereupon the spring 102 takes up the slack in the chain 105 causing the sprockets 106, 99, 98, 95 and 93 to rotate in clockwise direction and effecting movement of the gripping structure 16 to retracted or pan releasing position. It is understood, of course, that sprockets 93, 95, 98, 99, 106 and 113 have the same pitch diameter and the same number of teeth.

As described above, the gripping structure 66 is movable to grip the pan straps 20 on the table 39 and retain the pan straps on the table when the dumping structure is in its partially inverted bread dumping position 26'. When the dumping structure stops in its dumping position 26' upon reversal of the motor 57, as previously described, the loaves of bread fall forwardly out of the pans. A bread inverter bar 116 extends transversely of the apparatus subjacent the dumping structure, being so positioned as to intercept the rearward end portions of the falling inverted loaves. The unintercepted longer portions of the loaves continue to fall and the momentum thereof causes the loaves to be turned over and deposited in right side up row on the bread receiving shelf 117. The loaves of bread land on one wall 118 of the shelf 117 and are retained by the movable gate 119 until such time as the gate is opened to permit the loaves to slide on the bread take away conveyer 120.

The gate 119 is secured by clamping means 121, as shown in Figure 1, to a transversely extending shaft 122 journaled in bearings 123, as shown in Figures 2 and 6, which bearings are mounted on a stationary frame member of the apparatus. Referring particularly to Figure 6, an arm 124 is fixed on one end of the shaft 122, and pivotally connected to the free end of the arm 124 is a member 125, which member 125 is connected to the piston rod 126 of an air cylinder or motor 127. The air cylinder 127 is pivotally connected to the frame of the apparatus. When air is admitted to the upper end of air cylinder 127, the gate 119 is rotated to and held in its closed or bread supporting position, and when air is admitted to the lower end of air cylinder 127, the gate 119 is rotated to its open or bread releasing position. Alternate admission of air to the upper and lower end of the cylinder 127 for operating the gate 119 may be controlled in any suitable manner. For example, since the bread depanned by the described apparatus may go to a bread cooler, the functioning of the air cylinder 127 and consequently the gate 119, may be controlled by the reciprocating loading pusher of the bread cooler through suitable switch controlled electrical means operating conventional solenoid valve means for controlling admission of air to one end or the other of the air operated cylinder 127. Since such means is conventional and does not constitute a part of the present invention, it is not shown in the drawings.

When the gate 119 returns to its closed or bread supporting position it contacts normally open switch S-3, momentarily closing it. Momentary closing of switch S-3 effects actuation of solenoid operated valve 112 to admit air to the upper end of cylinder 111 moving the piston rod 110 down, whereby through the chain and sprocket arrangement previously described, the gripping structure 67 is moved to pan gripping position.

As the piston rod 110 descends it draws the chain 105 with it, which in turn rotates the sprocket 109 in counterclockwise direction as viewed in Figure 2, whereupon cam 128 carried by the sprocket 109 engages switch S-4. Closing of switch S-4 initiates operation of the motor 57 through suitable electrical connections, which motor 57 operates the dumping structure 26.

As previously explained, when the dumping structure reaches its bread dumping position 26', the cam 60 contacts reversing switch S-1 whereby the direction of rotation of motor 57 is reversed to rotate the dumping structure toward its pan unloading position 26". At the pan unloading position 26", cam 129 (see Figure 7) contacts switch S-5, which through suitable electrical connections actuates solenoid operated valve 112 to admit air to the lower end of cylinder 111 moving the piston rod 110 to its up position. Spring 102 (see Figure 9) thereupon takes up the slack in chain 105, and in so doing turns sprocket 106 in clockwise direction, whereupon through the chain and sprocket arrangement previously described, the gripping structure 67 is moved to pan releasing position.

At the same time that cam 129 contacts switch S-5 to release the gripping structure 67, cam 61 as previously described contacts switch S-1 to reverse the direction of motor 57 to rotate the dumping structure toward its pan receiving position 26. When the dumping structure reaches its pan receiving position 26, radially projecting arm 62 contacts the switch S-2 which, as previously described, stops the dumping structure motor 57. At the same time, a second contact on switch S-2 is caused to close and through suitable electrical connections energizes solenoid 36 which lifts the catch lever 34 to effect engagement of the single revolution clutch 33, whereupon through the means previously described, the pan gate 25 is lowered to permit a row of pans to be deposited on the table 39 of the dumping structure 26. As previously described, the solenoid 36 will only energize if pans are against the pan gate 25 which holds the normally open switch 37 closed. If pans are not against the gate 25, it will not drop and the dumping structure will then make an empty cycle.

The dumping structure 26 having completed a cycle as above explained, will now wait in its pan receiving position for the next operation of the bread gate 119, the operation of which as noted above is controlled by the air cylinder 127, the latter being operated by a solenoid actuated valve preferably controlled by the reciprocating pusher of a bread cooler, as previously explained.

We claim:

1. In a device for dumping bread loaves from baking pans, a table normally disposed to receive and support baking pans to be dumped, said table being pivotally mounted for rotation about a substantially horizontal axis, actuating means including a reversing motor for rotating said table from said receiving and supporting position to an upwardly inclined partially inverted position for dumping the bread loaves from said baking pans and for subsequently rotating said table from said bread dumping position through said receiving and supporting position to a downwardly sloping pan discharging position, a receiver for bread loaves dumped from said baking pans, said receiver having a gate mounted for rotation about a substantially horizontal axis, actuating means for rotating said gate between a position retaining the bread loaves on said receiver and a position for releasing the bread loaves from said receiver, gripping means carried by said table movable between an extended pan engaging position and a retracted pan disengaging position, actuating means for said gripping means including reciprocative motive means, chain and sprocket means operatively connecting said motive means and said gripping means and biasing means associated with said chain and sprocket means biasing said gripping means toward pan releasing position, first control means responsive to rotation of said gate into its bread loaf retaining position for operating said reciprocative motive means in a direction to move said gripping means through the medium of said chain and sprocket means to pan gripping position against the tension of said biasing means, second control means including a switch in circuit with said table rotating reversing motor and means carried by said chain and sprocket means engageable with said switch upon said gripping means reaching pan gripping position for energizing said reversing motor to initiate operation of said table from its normal pan receiving position, and third control means responsive to rotation of said table into its pan releasing position for operating said reciprocative motive means in a direction to relieve the tension on said biasing means whereby said biasing means through the medium of said chain and sprocket means moves said gripping means to pan releasing position.

2. In a device for dumping bread loaves from baking pans, a table normally disposed to receive and support baking pans to be dumped, said table being pivotally mounted for rotation about a substantially horizontal axis, actuating means including a reversing motor for rotating said table from said receiving and supporting position to an upwardly inclined partially inverted position for dumping the bread loaves from said baking pans and for subsequently rotating said table from said bread dumping position through said receiving and supporting position to a downwardly sloping pan discharging position and from its pan discharging position to its pan receiving position, a receiver for bread loaves dumped from said baking pans, said receiver having a gate mounted for rotation about a substantially horizontal axis, actuating means for rotating said gate between a position retaining the bread loaves on said receiver and a position for releasing the bread loaves from said receiver, gripping means carried by said table movable between an extended pan engaging position and a retracted pan disengaging position, actuating means for said gripping means including reciprocative motive means, chain and sprocket means operatively connecting said motive means and said gripping means and biasing means associated with said chain and sprocket means biasing said gripping means toward pan releasing position, first control means responsive to rotation of said gate into its bread loaf retaining position for operating said reciprocative motive means in a direction to move said gripping means through the medium of said chain and sprocket means to pan gripping position against the tension of said biasing means, second control means including a switch in circuit with said table rotating reversing motor and means carried by said chain and sprocket means engageable wtih said switch upon said gripping means reaching pan gripping position for energizing said reversing motor to initiate operation of said table from its normal pan receiving position, third control means including a reversing switch responsive to rotation of said table into its pan releasing position for operating said reciprocative motive means in a direction to relieve the tension on said biasing means whereby said biasing means through the medium of said chain and sprocket means moves said gripping means to pan releasing position, and fourth control means including a switch in circuit with said table rotating reversing motor and a switch actuator rotatable with said table, said switch actuator engaging said last named switch in response to movement of said table into its pan receiving position from its pan discharging position for deenergizing said table actuating means.

3. In an apparatus for dumping bread loaves from baking pans, a frame, a table adapted to receive baking pans to be dumped, a substantially horizontal table supporting shaft extending across the under side of said table and to which shaft said table is rigidly secured, crank arms secured to the ends of said shaft adjacent the opposite side edges of said table, said crank arms extending perpendicularly from said table supporting shaft and perpendicularly with respect to the plane of said table from the said under side of the plane of said table to and beyond the other side of the plane thereof, and shaft members parallel to said table supporting shaft rigid with and extending outwardly from the ends of said crank arms opposite their connection with said table supporting shaft, said shaft members being mounted for rotation in said frame, and means for rotating said shaft members whereby on rotation of said shaft members said table and said table supporting shaft revolve about the axes of said shaft members.

4. An apparatus as set forth in claim 1 wherein said reciprocative motive means includes a cylinder and a piston in said cylinder connected to said chain means and an air valve connected to said cylinder for selectively admitting air to opposite sides of said piston, wherein said first control means includes a switch connected to said air valve, said switch engageable by said gate in its bread loaf retaining position for actuating said air valve to admit air to said cylinder for operating said piston to move said gripping means through the medium of said chain and sprocket means to pan gripping position against the tension of said biasing means, and wherein said third control means includes a switch connected to said air valve and a switch actuator rotatable with said table, said switch actuator engaging said last named switch in the pan releasing position of said table for actuating said air valve to admit air to said cylinder for operating said piston in a direction to effect movement of said gripping means to pan releasing position through the medium of said biasing and chain and sprocket means.

References Cited in the file of this patent

UNITED STATES PATENTS 2,633,258    Temple et al.            Mar. 31, 1953